March 27, 1962 H. HEIJLIGERS 3,027,421
CIRCUIT ARRANGEMENT FOR AUTOMATICALLY ADJUSTING
THE BRIGHTNESS AND THE CONTRAST
IN A TELEVISION RECEIVER
Filed Feb. 11, 1960 2 Sheets-Sheet 1

INVENTOR
HENDRIK HEIJLIGERS.
BY
Frank R. Jifani
AGENT

March 27, 1962 H. HEIJLIGERS 3,027,421

CIRCUIT ARRANGEMENT FOR AUTOMATICALLY ADJUSTING THE BRIGHTNESS AND THE CONTRAST IN A TELEVISION RECEIVER

Filed Feb. 11, 1960 2 Sheets-Sheet 2

INVENTOR

HENDRIK HEIJLIGERS.

BY Frank R. Jeifari

AGENT

United States Patent Office 3,027,421
Patented Mar. 27, 1962

3,027,421

CIRCUIT ARRANGEMENT FOR AUTOMATICALLY ADJUSTING THE BRIGHTNESS AND THE CONTRAST IN A TELEVISION RECEIVER

Hendrik Heijligers, Eindhoven, Netherlands, assignor to North American Philips Company, Inc., New York, N.Y., a corporation of Delaware Filed Feb. 11, 1960, Ser. No. 8,078
Claims priority, application Netherlands Feb. 14, 1959
10 Claims. (Cl. 178—7.5)

This invention relates to a circuit arrangement for the automatic adjustment of the brightness and the contrast in a television receiver in defense of the ambient brightness with the aid of a photo-sensitive element, preferably a cadmium sulfide element, the receiver being provided with a circuit arrangement for automatic gain control, while the video signal, which contains a direct-current component, is taken from an output terminal of a video output stage and is applied to a control electrode of a display tube.

It is desirable for such a television receiver to be provided with a circuit arrangement which automatically adjusts the contrast and the brightness of the displayed image on variation of the ambient brightness.

Several circuit arrangements are known in which this is effected in that, with the aid of a photo-sensitive element the impedance of which varies as a function of the incident light, the automatic gain control circuit is influenced either directly or indirectly so that the amplitude of the video signal is varied. At the same time the bias voltage for an electrode of the display tube of the receiver is varied by means of this impedance variation. In these arrangements the photo-sensitive element must be disposed at a suitable point in the receiver, for example on the front panel below the display screen or on the top, so that the external light can readily impinge thereon.

However, such circuit arrangements have a limitation in that a video signal of variable amplitude is also supplied to the arrangements in the receiver for the separation of the synchronizing signals and of the interference signals, so that their adjustment becomes more critical and their operation less reliable.

The circuit arrangement according to the present invention avoids these disadvantages and is characterized in that there is connected between the positive and negative terminals of a direct voltage supply a potentiometer circuit comprising the series and/or parallel arrangements of the resistance elements and the photo-sensitive element, one of the tappings on this potentiometer being connected to the output terminal of the video output stage while another tapping is connected to the control electrode concerned of the display-tube, the photo-sensitive element being connected in the potentiometer circuit between the tappings.

Figure 1:
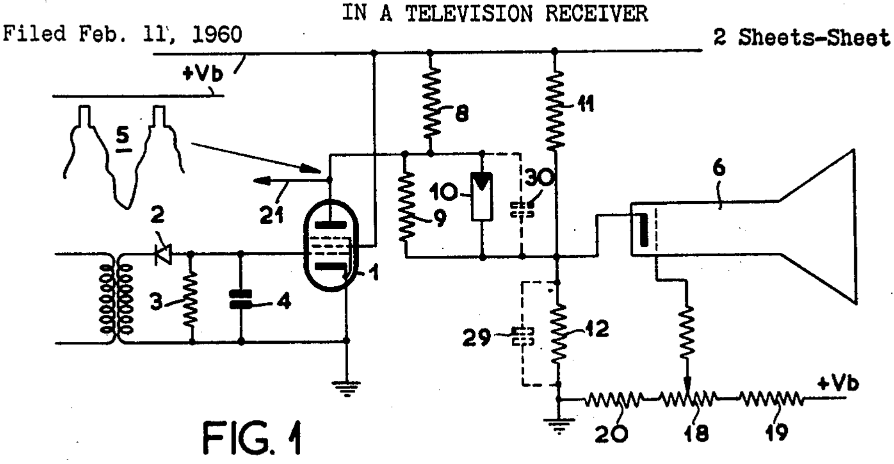
Figure 2:
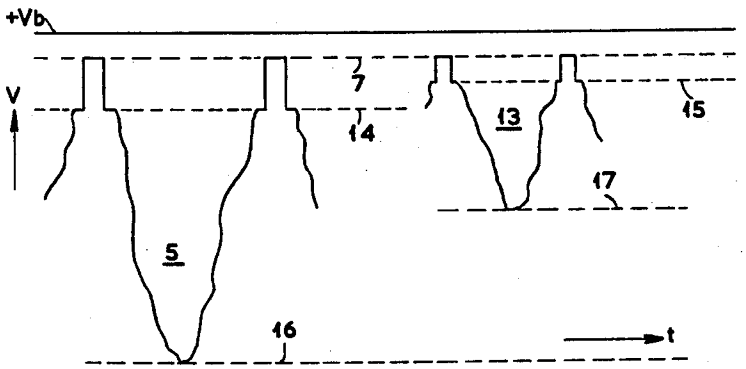
Figure 3:
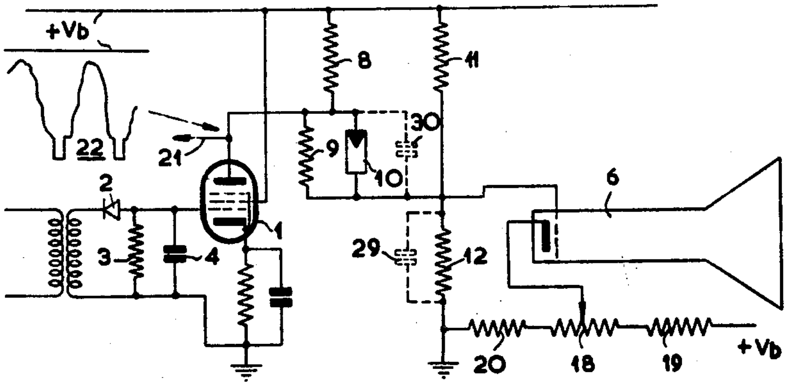
Figure 4:
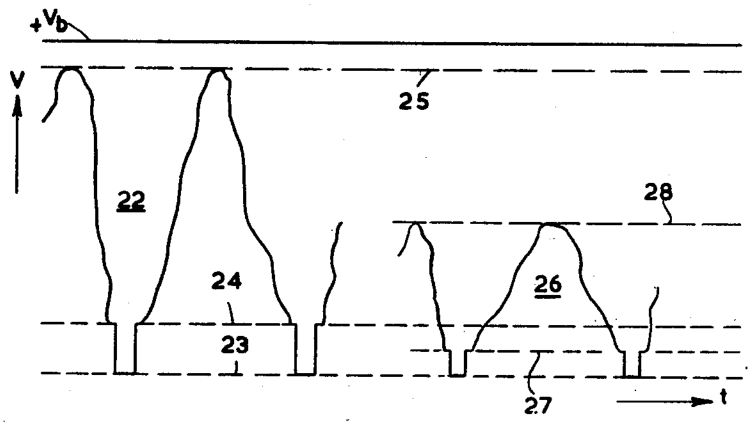
Figure 5:
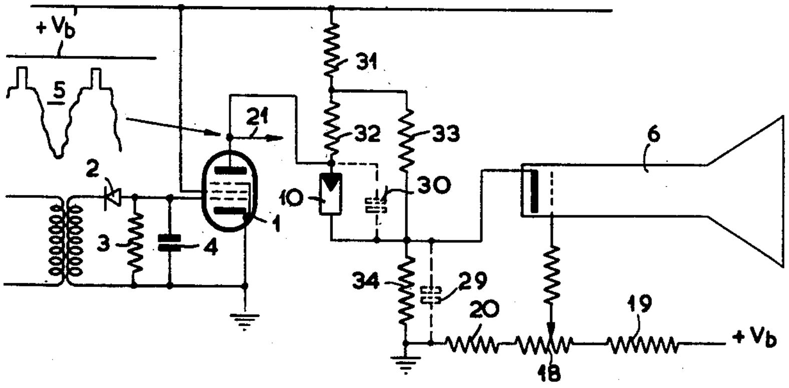

A few embodiments of circuit arrangements according to the invention will now be described, by way of example, with reference to the accompanying drawings in which:

FIG. 1 shows a circuit arrangement in which the video signal is applied to the cathode of the display tube, FIG. 2 is a diagram illustrating the operation of a circuit arrangement of FIG. 1, FIG. 3 shows a circuit arrangement of the kind shown in FIG. 1, in which, however, the video signal is applied to the Wehnelt-cylinder of the display tube, FIG. 4 is a diagram illustrating the operation of the circuit arrangement of FIG. 3, and FIG. 5 shows a further circuit arrangement, in which the video signal is also applied to the cathode of the display tube.

In FIG. 1, reference numeral 1 denotes the video output valve of the receiver, to the control electrode of which there is applied the video signal concerned which is taken from a detector circuit comprising a rectifier 2, a resistor 3 and a capacitor 4. At the anode of this valve there is produced a video signal 5 having the polarity shown in this figure. Since in this embodiment the video signal taken from the anode of the valve 1 must finally be applied to the cathode of a display tube 6, the peaks of the synchronizing signals lie on a level shown by the line 7 in FIG. 2, which level differs only slightly from the supply voltage $V_b$ supplied by the direct-voltage source in the receiver.

In order to enable both the contrast and the brilliance of the image displayed by the tube 6 to be varied on variation of the ambient brightness, the potentiometer circuit in accordance with the invention, which is connected between the positive and negative terminals of a direct-voltage source (not shown), comprises elements 8, 9, 10, 11 and 12. The anode of the valve 1 is connected to a tapping constituted by the junction of the resistors 8 and 9, so that the resistor 8 acts as an anode impedance of the valve 1. The video signal 5 produced across this resistor being applied, through the parallel combination of the resistor 9 and the photo-sensitive element 10, to the cathode of the display tube 6, which cathode is connected between the resistors 11 and 12. The resistors 11 and 12 are proportioned so that the direct voltage $V_s$ set up at the cathode of the display tube 6 is substantially equal to:

$$V_s=\frac{R_{12}}{R_{11}+R_{12}}V_b$$

Where $R_{11}$ is the resistance value of the resistor 11 and $R_{12}$ the resistance value of the resistor 12.

This voltage $V_s$ is chosen in accordance with the voltage level indicated by the line 7 and, since the automatic gain control arrangement in the receiver ensures that, irrespective of the strength of the television signal received the peaks of the synchronizing pulses of the signal 5 remain substantially on the level indicated by the line 7, the peaks of the synchronizing signal of a video signal 13 produced at the cathode of the tube 6 will lie on the level indicated by the line 7.

If, now, the photo-sensitive element is not or hardly irradiated, that is to say, if the receiver is arranged in a substantially dark room, the impedance of the element 10 is very high so that, since the resistor 12 is large in relation to the resistor 11, the voltage division of the signal 5 is substantially determined by the ratio between the resistors 9 and 11. If it is assumed, for example, that these two resistors are equal, the amplitude of the signal 13 produced across the resistor 11 will be one half of the amplitude of the signal 5. From FIG. 2 it will be seen that the black level of the signal 5 lies on the level indicated by the line 14 but that the black level of the signal 13 lies on the level indicated by the line 15, while for the signal peak white is determined by a line 16 and for the signal 13 by a line 17.

The impedance of the element 10 decreases with increase in the ambient brightness, so that the attenuation of the signal 5 by the elements 9, 10 and 11 decreases progressive and hence the amplitude of the signal 13 increases gradually. In the fully irradiated condition, the impedance of the element 10 has become very small, so that in this condition the anode of the valve 1 can be considered to be directly connected to the cathode of the display tube 6. Thus, the signal 13 will have nearly the same amplitude as the signal 5 so that the line 15 substantially coincides with the line 14 and the line 17 with the line 16.

By means of the potentiometer circuit comprising resistors 18, 19 and 20, such a positive potential with respect to earth is applied to the Wehnelt cylinder of the display tube that, when the voltage set up at the cathode of the display tube 6 reaches a voltage level indicated by the line 15, no electrons can flow in the display tube. Hence, it will be appreciated that with varying impedance of the element 10 not only does the contrast of the displayed image vary but also, since the so-called black level of the signal 13 shifts in a direction from the level indicated by the line 15 to the level indicated by the line 14, the background brightness of the displayed image increases. This is necessary, since the observer's eye has also adapted to the increased ambient brightness. The increase in background brightness ensures that with this new adaptation of the eye the increased background brightness is seen as black by the observer, so that the displayed image gives the correct brightness impression.

If care is taken that the resistance value of the resistor 11 is large in relation to that of the resistor 8, in the fully irradiated condition the anode impedance of the valve 1, which in this condition comprises the parallel combination of the resistor 8 and 11, remains substantially constant, so that the amplitude of the signal 5 remains substantially the same in the irradiated and in the non-irradiated conditions. As a result, the video signal 5 which is supplied to the synchronisation separator and the interference separator circuits through a lead 21, does not vary while at the same time the required variation at the cathode of the display tube 6 is effected.

It should be noted that the term "fully irradiated condition" is to be understood to mean the condition in which the resistance value of the photo-sensitive element is a minimum. Although the ambient brightness may increase still further, this does not affect the adjustment.

When the video signal is not applied to the cathode but to the Wehnelt cylinder of the display tube 6, the circuit arrangement remains substantially the same, as is shown in FIG. 3. However, the video signal now must have a polarity as shown at 22 in FIG. 3 and hence, as is shown in FIG. 4, the peaks of the synchronizing signal lie on the level indicated by a line 23, the black level being indicated by a line 24 and peak white by a line 25. It will be appreciated that the voltage $V_s'$ set up at the Wehnelt cylinder of the tube 6, which voltage is determined by the ratio between the resistors 11 and 12, now must correspond not with the level shown by the line 7 in FIG. 2 but with the level shown by the line 23 in FIG. 4. In the non-irradiated condition, a signal 26 produced across the resistor 11 will have an amplitude which, with equal values of the resistors 9 and 11, is one half of that of the signal 22. The black level of the signal 26 is determined by the level shown by a line 27 and peak white is indicated by a line 28. With increase in the irradiation of the element 10, the amplitude of the signal 26 increases until its value is again substantially equal to that of the signal 22. Thus, the line 27 shifts in the direction of the line 24, and the line 28 in the direction of the line 25. If the cathode of the display tube 6 is adjusted, by means of the potentiometer circuit comprising the resistors 18, 19 and 20, to a potential such that the electron current is cut off when the Wehnelt cylinder reaches a potential corresponding with the level indicated by the line 27, with increase in the irradiation of the element 10 the electron current will no longer be cut off when the signal 26 has a voltage corresponding to a black level which differs from the level indicated by the line 27, so that the background brightness is increased.

It will be appreciated that in the circuit arrangement of FIGS. 1 and 3 the resistors 9 and 11 need not be equal but may have any value capable of reducing the signal set up across the resistor 11 to the desired value.

Owing to the unavoidable stray capacitances of the circuit, however, there is no complete freedom in the choice of these resistors. There is always a stray capacitance 29 between the cathode of the display tube 6 and earth while the element 10 also has a stray capacitance 30. These two capacitances provide a voltage division of the video signal 5 or 22 respectively at the high frequencies, while at the low frequencies this voltage division is substantially determined by the elements 9, 10 and 11. Since, however, the voltage divisions for high and low frequencies must be substantially equal, it will be appreciated that both in the unirradiated and in the irradiated conditions of the element 10 the choice of the resistance values of 9 and 11 depends upon the values of the stray capacitances 29 and 30.

Owing to the fact that in an irradiated condition of the element 10 such that its resistance value is of the same order of magnitude as that of the resistance element 9, the total impedance of the parallel combination of 9 and 10 for comparatively high frequencies in the video signal must be small in relation to that of the stray capacitance 30, since otherwise in this condition the attenuation of these high frequencies will be the same as in the unirradiated condition, the resistance value of the resistor 11 is substantially fixed with a certain desirable voltage division of the video signal. Since the voltage $V_s$ or $V_s'$ must correspond to the level of the peaks of the synchronizing signal, with a certain anode impedance 8 there is no longer freedom in the choice of the resistor 12 so that in some cases the requirement that the resistance value of 11 must be large in relation to that of 8, cannot be completely satisfied.

The circuit arrangement of FIG. 5 overcomes these difficulties. In this circuit arrangement, the potentiometer circuit connected between the positive and negative terminals of the direct-voltage source comprises resistors 31, 32, 33, and 34 and a photo-sensitive element 10. The cathode of the display tube 6 is connected to a tapping between the resistors 33 and 34 while the anode of the video output valve 5 is connected to a tapping between the resistor 32 and the photo-sensitive element 10. By means of the potentiometer circuits 18, 19 and 20 the potential associated with this circuit arrangement can be applied to the Wehnelt cylinder, while the video signal 5 is produced across the resistors 31 and 32 which act as the anode impedance.

If the receiver is arranged in a dark room, the resistance value of the element 10 is so high that the cathode of the display tube 6 is connected, through the resistor 33, to the tapping between the resistors 31 and 32, only part of the video signal produced across the resistors 31 and 32 being applied to the cathode of the tube 6. In this condition, the direct voltage for the cathode of the display tube 6 is determined, when the valve 1 is cut off, by the ratio of the series arrangement of the resistors 31 and 32 to the resistor 34. The resistors are proportioned so that the resistor 32 is about 4 times as large as the resistor 31, the resistor 33 is large in relation to the resistor 32 and the resistor 34 is large in relation to the resistor 33.

In the fully irradiated condition, the element 10 can substantially be considered as a short circuit, so that the resistors 32 and 33 are connected in parallel with one another and the direct-voltage level for the cathode of the display tube 6, with cut-off valve 10, is substantially determined by the ratio of the series combination of the resistors 31 and 32 to the resistor 34. Since the sum of 31 and 32 is materially less than the sum of 31 and 33, the direct voltage supplied to the cathode of the display tube 6 with valve 1 cut-off will be considerably higher in the fully irradiated condition than in the non-irradiated condition. However, this is necessary, since in the fully irradiated condition, the cathode of the display tube 6 can be considered as being directly connected to the anode of the video valve 1 so that the full amplitude of the video signal 5 is applied to the cathode. In the unirradiated condition, however, only the signal taken from the tapping between 31 and 32 is applied to the cathode and hence not only is the amplitude less, but also the peaks of the synchronizing pulses and hence the black level will be at a higher level, so that the direct voltage applied to the cathode of the valve 6 must be reduced as compared with the case of the irradiated condition by the said direct-voltage division.

This will be illustrated with reference to a numerical example.

The values of the resistors 31, 32, 33 and 34 are:

$$R_{31}=1\text{ k}\Omega;\ R_{32}=4\text{ k}\Omega$$
$$R_{33}=20\text{ k}\Omega;\ R_{34}=100\text{ k}\Omega$$

The values of the supply voltage $V_b$, the level $V_{top}$ of the peaks of the synchronizing signal and the black level $V_z$ at the anode of the valve 1 are:

$$V_b=200\text{ v.}$$
$$V_{top}=200-15=185\text{ v.}$$
$$V_z=200-(15+20)=165\text{ v.}$$

For the non-irradiated condition, these voltages at the tapping between the resistors 31 and 32 become:

$$V_{top}=200-\tfrac{1}{5}.15=197\text{ v.}$$
$$V_z=200-\tfrac{1}{5}(15+20)=193\text{ v.}$$

In this non-irradiated condition, the direct voltage set up at the cathode of the display tube 6 when the valve 1 is cut off becomes approximately 166 v. and can be considered as the level from which the video signal decreases the voltage. The black level produced by the video signal can be similarly found for the tapping between the resistors 31 and 32 from $$V_z'=166-\tfrac{1}{5}.(15+20)=159\text{ v.}$$

If it is assumed that the cut-off voltage of the display tube 6 is 60 v., a voltage of 99 v. must be applied to the Wehnelt cylinder of this tube so that the electron current in the display tube 6 is just cut off at the occurrence of the black level $V_z'$.

In the fully irradiated condition, the direct voltage of the cathode of the display tube becomes about 190 v. when the valve 1 is cut off. Initially it was assumed that the anode impedance of the valve 1 substantially comprises the resistors 31 and 32 and hence for this fully irradiated condition the new black level is $$V_z''=190-(15+20)=155\text{ v.}$$

Consequently, at the occurrence of the black level $V_z''$ the negative voltage in the tube is 155 v.—99 v.=56 v. This means that the negative voltage is 4 v. less than in the non-irradiated condition so that the background brilliance is increased similarly as in the circuit arrangements of FIGS. 1 and 3.

It should be noted that in the above numerical example, the voltage of 15 v. used in the calculation of the voltage $V_{top}$ is the voltage difference between the supply voltage $V_b$ and the level of the line 7 shown in FIG. 2. The voltage of 20 v. used in the calculation of the black level $V_z$ is equal to the amplitude of the synchronizing signal as shown in FIG. 2 between the lines 7 and 14.

It should also be noted that by the parallel connection of the resistors 32 and 33 the anode impedance will be slightly reduced in the fully irradiated condition, so that the amplitude of the video signal applied to the cathode of the display tube 6 and taken from the lead 21 will be reduced and the background brilliance also will be increased to a lesser extent than in the above numerical example.

Finally it should be mentioned that hereinbefore in the calculation of the amplitude of the synchronizing signal applied to the cathode of the display tube 6, the end of the resistor 31 connected to the supply voltage lead can be considered as earthed for alternating currents, so that for the said calculation the attenuating effect of the potentiometer circuits comprising the resistors 33 and 34 is negligible, since the resistor 34 is many times as large as the sum of the resistors 31 and 32.

In this circuit arrangement, a suitable choice of the resistor 33 enables the influence of the stray capacitances 29 and 30 to be highly reduced as compared with the FIGS. 1 and 3, for the element 10 having a stray capacitance 30 can be considered as being shunted by the series arrangement of the resistors 32 and 33 so that, if care is taken that for the high frequencies the series impedance of the two latter resistances is small in relation to that of the capacitor 30, the voltage division beyond the anode of the valve 1 is substantially determined by the elements of the potentiometer circuit and not by the stray capacitances 29 and 30. In the arrangement of FIG. 5, the sum of 32 and 33 can be less than the resistance value of the resistor 9 of FIGS. 1 and 3, since a potentiometer comprising the resistors 9, 11 and 12 need not be allowed for, so that the resistor 34 can be materially larger than the resistor 12 of FIGS. 1 and 3. Obviously, the choice of the resistor 33 is limited since, if this resistor should be reduced, it's true the influence of the stray capacitances would be reduced, but also the anode impedance would change materially from the irradiated to the non-irradiated condition, and this must be avoided as far as possible.

It will also be appreciated that, if a different amplitude variation at the cathode of the display tube 6 and a different brightness variation are required, they can be determined by a different choice of the values of the elements 31, 32, 33 and 34.

The circuit arrangement of FIG. 5 also can be converted to a circuit arrangement in which the video signal is applied to the Wehnelt cylinder of the display tube 6. In this event, the desired positive potential is applied to the cathode of the display tube 6 by means of the potentiometer circuit comprising the resistors 18, 19 and 20, while the Wehnelt cylinder is connected to the tapping between the resistors 33 and 34. It is desirable in that case to set up a negative potential with respect to earth at the end of the resistor 34 which is connected to earth in FIG. 5, since the black level of the video signal, which is produced at the anode of the valve 1 with a polarity as shown at 22 in FIG. 3, is much lower than if the video signal is applied to the cathode of the display tube 6. Hence, in this latter event the potentiometer circuit comprising the elements 10, 31, 32, 33 and 34 must be connected between the positive and negative terminals of a direct voltage source the negative terminal of which is not connected to earth, as in the preceding embodiments, but a tapping therefrom so that the desired negative potential for the said end of the resistor 34 with respect to earth is obtained.

What is claimed is:

1. A circuit for the automatic adjustment of brightness and contrast of a display tube in response to exterior illumination comprising, a display tube having a control element, a video output stage having an output terminal, a source of direct voltage, a resistive potentiometer circuit connected in series with said source of direct voltage, said potentiometer having first and second taps, means connecting said first tap to said output terminal, means connecting said second tap to said control electrode, a photo-sensitive impedance element exposed to said illumination, and means connecting said impedance element in parallel with at least a portion of said potentiometer circuit between said first and second taps, whereby the resistance between said output terminal and control element is varied in response to said illumination.

2. A television circuit for the automatic adjustment of picture brightness and contrast in response to exterior illumination comprising, a display tube having a control element, an amplifying device having an input terminal and an output terminal, a source of video signals connected to said input terminal, a source of direct voltage, a resistive potentiometer connected in series with said source of direct voltage, said potentiometer having first and second taps, means connecting said first tap to said output terminal, means connecting said second tap to said control element, a photo-sensitive impedance element exposed to said illumination, and means connecting said impedance element in parallel with at least a portion of said potentiometer circuit between said first and second taps, whereby the resistance between said output terminal and control element is varied in response to said exterior illumination.

3. A television circuit for the automatic adjustment of picture brightness and contrast in response to exterior illumination comprising, a display tube having a control element, an amplifying device having an input terminal and an output terminal, a source of video signals connected to said input terminal, a source of direct voltage having a positive terminal and a negative terminal, first resistive circuit means having first and second parallel resistive branches, second resistive circuit means, said first and second resistive circuit means being serially connected with one end of said first circuit means being connected to said positive terminal and one end of said second circuit means being connected to said negative terminal, means connecting the other ends of said first and second circuit means to said control element, said first branch comprising first and second serially connected resistors with one end of said first resistor being connected to said other end of said first and second circuit means, means connecting the junction of said resistors to said output terminal, and a photo-sensitive impedance element exposed to said illumination and connected in parallel with said first resistor, whereby the resistance between said output terminal and control element is varied in response to said exterior illumination.

4. A television circuit for the automatic adjustment of picture brightness and contrast in response to exterior illumination comprising, a display tube having a control element, an amplifying device having an input terminal and an output terminal, a source of video signals connected to said input terminal, a source of direct voltage having a positive terminal and a negative terminal, first, second and third resistors connected serially between said positive and negative terminals in that order, means connecting the junction of said first and second resistors to said output terminal, a fourth resistor connected between said positive terminal and the junction of said second and third resistors, means connecting said last-mentioned junction to said control element, a photo-sensitive impedance element exposed to said exterior illumination, and means connecting said impedance element in parallel with said second resistor, whereby the resistance between said output terminal and control element is varied in response to said exterior illumination.

5. The circuit of claim 4, in which the direct voltage $V_s$ at said control element is substantially equal to:

$$\frac{R_3}{R_3+R_4}V_b$$

where $R_3$ and $R_4$ are the resistances of said third and fourth resistors and $V_b$ is the voltage of said direct voltage source, and $V_s$ is substantially equal to the voltage at said output terminal when the peaks of synchronizing pulses occur in said video signals.

6. A television circuit for the automatic adjustment of picture brightness and contrast in response to exterior illumination comprising, a display tube having a control element, an amplifying device having an input terminal and an output terminal, a source of video signals connected to said input terminal, a source of direct voltage having a positive terminal and a negative terminal, a first resistor having one end connected to said positive terminal, a second resistor having one end connected to said negative terminal, a network having first and second parallel branches connected serially between the other ends of said first and second resistors, means connecting the other end of said second resistor to said control element, said first branch comprising a serially connected third resistor and photo-sensitive impedance element with one end of said impedance element being connected to the other end of said second resistor, said impedance element being exposed to said illumination and means connecting the other end of said impedance element to said output terminal, whereby the resistance between said output terminal and control element is varied in response to said exterior illumination.

7. A television circuit for the automatic adjustment of picture brightness and contrast in response to exterior illumination comprising, a display tube having a control element, an amplifying device having an input terminal and an output terminal, a source of video signals connected to said input terminal, a source of direct voltage having a positive terminal and a negative terminal, first, second and third resistors serially connected between said positive and negative terminals in that order, means connecting the junction of said second and third resistors to said control element, a fourth resistor connected between said output terminal and the junction of said first and second resistors, and a photo-sensitive impedance element exposed to said illumination and connected in parallel with said second and fourth resistors, whereby the resistance between said output terminal and control element is varied in response to said exterior illumination.

8. The circuit of claim 7, in which the resistance of said fourth resistor is greater than the resistance of said first resistor, the resistance of said second resistor is greater than the resistance of said fourth resistor, and the resistance of said third resistor is substantially greater than the resistance of said second resistor.

9. A television circuit for the automatic adjustment of picture brightness and contrast in response to exterior illumination comprising, a display tube having a control element, an amplifying device having an input terminal and an output terminal, a source of automatically gain controlled video signals connected to said input terminal, a source of direct voltage, a resistive potentiometer connected serially with said source of direct voltage, said potentiometer having first and second taps, means connecting said first tap to said output terminal, means connecting said second tap to said control element, a photo-sensitive impedance element exposed to said exterior illumination, and means connecting said impedance element in parallel with at least the portion of said potentiometer between said first and second taps, whereby the resistance between said output terminal and control element is varied in response to said exterior illumination.

10. The circuit of claim 9, in which said impedance element comprises a cadmium-sulfide element.

References Cited in the file of this patent

UNITED STATES PATENTS 2,264,172 Batchelor ------------- Nov. 25, 1941